(12) United States Patent
Tanaka et al.

(10) Patent No.: US 7,067,452 B2
(45) Date of Patent: Jun. 27, 2006

(54) CERAMIC CATALYST BODY

(75) Inventors: Masakazu Tanaka, Okazaki (JP);
Tosiharu Kondo, Toyoake (JP);
Tomohiko Nakanishi, Nishio (JP);
Kazuhiko Koike, Nishio (JP); Takashi Kondo, Kariya (JP); Tomomi Hase, Kariya (JP); Miho Ito, Kariya (JP)

(73) Assignees: Denso Corporation, Kariya; Nippon Soken, Inc., Nishio (JP)

( * ) Notice: Subject to any disclaimer, the term of this patent is extended or adjusted under 35 U.S.C. 154(b) by 0 days.

(21) Appl. No.: 09/960,498

(22) Filed: Sep. 24, 2001

(65) Prior Publication Data

US 2002/0039966 A1    Apr. 4, 2002

(30) Foreign Application Priority Data

Sep. 29, 2000   (JP) .............................. 2000-298005
Sep. 29, 2000   (JP) .............................. 2000-298019
Jul. 26, 2001   (JP) .............................. 2001-225454
Jul. 26, 2001   (JP) .............................. 2001-225615

(51) Int. Cl.
*B01J 23/00* (2006.01)
*B01J 21/00* (2006.01)

(52) U.S. Cl. .................... 502/242; 502/250; 502/248; 502/256; 502/305; 502/306; 502/309; 502/311; 502/313

(58) Field of Classification Search ................ 502/242, 502/250, 248, 256, 305, 306, 309, 311, 313
See application file for complete search history.

(56) References Cited

U.S. PATENT DOCUMENTS

| 3,956,186 | A |   | 5/1976 | Iwase et al. |
| 4,189,405 | A |   | 2/1980 | Knapton et al. |
| 4,956,329 | A |   | 9/1990 | Chao et al. |
| 5,006,221 | A | * | 4/1991 | Uchikawas et al. ......... 204/426 |
| 5,334,570 | A | * | 8/1994 | Beauseigneur et al. ..... 502/304 |
| 5,346,722 | A |   | 9/1994 | Beauseigneur et al. |
| 5,489,865 | A |   | 2/1996 | Colvin, Sr. |
| 5,552,360 | A | * | 9/1996 | Farrauto et al. ............ 502/178 |

(Continued)

FOREIGN PATENT DOCUMENTS

JP        A-62-4441        1/1987

(Continued)

OTHER PUBLICATIONS

English translation of JP 62-004441A.*

*Primary Examiner*—Steven Bos
(74) *Attorney, Agent, or Firm*—Posz Law Group, PLC

(57) ABSTRACT

(i) In a ceramic catalyst body which comprises a ceramic carrier which has a multitude of pores capable of supporting a catalyst directly on the surface of a substrate ceramic and a catalyst supported on the ceramic carrier, a layer containing an anti-evaporation metal such as Rh is formed on the outer surface of catalyst metal particles such as Pt or Rh. The layer containing the anti-evaporation metal protects the catalyst metal and prevents evaporation thereof, thereby suppressing the deterioration; and/or (ii) A ceramic catalyst body is made by having a main catalyst component and a promoter component directly on a ceramic carrier which can directly support the catalyst by substituting a part of the constituent elements of cordierite, and a trap layer is provided in the upstream thereof for trapping sulfur which is a catalyst poisoning component included in the exhaust gas. Since sulfur included in the exhaust gas can be collected by the trap layer, the catalyst poisoning component can be removed from the gas which enters the catalyst, thus preventing catalyst poisoning.

36 Claims, 4 Drawing Sheets

U.S. PATENT DOCUMENTS

| | | | |
|---|---|---|---|
| 5,607,885 A | 3/1997 | Ichii et al. | |
| 5,716,899 A | 2/1998 | Guile et al. | |
| 6,121,191 A * | 9/2000 | Komatsu et al. | 502/330 |
| 6,171,573 B1 | 1/2001 | Sato | |
| 6,174,835 B1 * | 1/2001 | Naito et al. | 502/325 |
| 6,375,910 B1 * | 4/2002 | Deeba et al. | 423/239.1 |
| 6,413,904 B1 * | 7/2002 | Strehlau et al. | 502/328 |
| 6,497,848 B1 * | 12/2002 | Deeba et al. | 422/180 |
| 2002/0039964 A1 * | 4/2002 | Tanaka et al. | |
| 2002/0042344 A1 * | 4/2002 | Kondo et al. | |
| 2002/0045541 A1 * | 4/2002 | Koike et al. | |
| 2002/0077248 A1 * | 6/2002 | Nakanishi et al. | |
| 2003/0007905 A1 * | 1/2003 | Tanaka et al. | |
| 2003/0022788 A1 * | 1/2003 | Tanaka et al. | |
| 2003/0045422 A1 * | 3/2003 | Tanaka et al. | |
| 2003/0061862 A1 * | 4/2003 | Kondo et al. | |

FOREIGN PATENT DOCUMENTS

| | | | |
|---|---|---|---|
| WO | 99/19060 | * | 4/1999 |

* cited by examiner

CERAMIC CATALYST BODY

BACKGROUND OF THE INVENTION

1. Field of the Invention

The present invention relates to a ceramic catalyst body and a ceramic carrier used in a catalytic converter for purifying an exhaust gas of an automobile engine or the like, and to a method of producing the same.

2. Description of the Related Art

There have been increasing demands in recent years to reduce the $CO_2$ emission from automobiles, through improvement in the combustion efficiency and by cleaning the exhaust gas, for the preservation of the global environment. Accordingly, three-way catalysts have been widely used as the catalytic converter for purifying an exhaust gas, and the use of a NOx occluding reduction catalyst or the like has been increasingly employed for Diesel engines. These catalysts are typically produced by coating the surface of a monolithic carrier, such as honeycomb structure made of cordierite which has high heat resistance, with a material that has large specific surface area such as γ-alumina and depositing a noble metal catalyst such as Pt or Rh to be supported on the ceramic carrier. The NOx occluding reduction catalyst has, in addition to the main catalyst component, an NOx occluding substance as a promoter which adsorbs NOx molecules which are released in lean atmosphere, and releases the NOx in rich atmosphere, so as to be reduced by the noble metal catalyst and so that NOx is detoxified.

The catalyst of the prior art has a coating layer of the material of large specific surface area, because the cordierite carrier of the prior art does not have a specific surface area large enough to carry the required amount of catalyst component. When the surfaces of the carrier is coated with the material of a large specific surface area, however, the heat capacity of the carrier increases due to the increase in the mass, which is undesirable in view of early activation of the catalyst. The coating method also has a problem in that the decrease in the opening area of the cell of the honeycomb structure leads to an increase in the pressure loss, and the thermal expansion coefficient becomes larger than that of a carrier which is made solely of cordierite.

A ceramic carrier which can support a required amount of catalyst component without forming a coating layer by increasing the specific surface area of cordierite itself has been already known (for example, Japanese Patent Examined Publication No. 5-50338). However, the ceramic carrier is not practically available because of its short, catalytic life. It was found that evaporation of the catalyst during operation over a long period of time might decrease the catalyst performance. This is because the noble metal used as the catalyst turns into an oxide with a low melting point through contact with an oxidizing gas. It was found that the catalyst described above is more prone to the problem of catalyst evaporation than the catalyst of the prior art which supports the catalyst in pores of γ-alumina.

Also, it was found that this ceramic carrier is vulnerable to the influence of the exhaust gas, which flows through the cells because the catalyst is supported directly in a multitude of pores which open to the surfaces of the cell walls, and is therefore more liable to damage caused by catalyst poisoning than the catalyst of the prior art which supports the catalyst in the porous coating layer. An alkali metal or an alkali earth metal used as the NOx occluding substance is turned into a sulfate by poisoning with the sulfur which is included in the exhaust gas and, as a result, it loses the NOx occluding capacity. In the three-way catalyst, there is also a possibility that a trace component, which is added as the promoter, is damaged.

SUMMARY OF THE INVENTION

An object of the present invention is to provide a high performance ceramic catalyst body which suppresses the deterioration and has high durability as well as a method of producing the same.

Another object of the present invention is to improve the poisoning resistance of the catalyst body, comprising the ceramic carrier capable of supporting the catalyst directly on the ceramic carrier, by preventing catalyst poisoning from occurring due to the poisoning component of the exhaust gas or by regenerating the catalyst which has been deteriorated by poisoning.

According to a first aspect of the invention, the ceramic catalyst body comprises a ceramic carrier which has a multitude of pores that are capable of supporting a catalyst component directly on the surface of a substrate ceramic, and a catalyst supported on the ceramic carrier, wherein the catalyst particles are provided with a layer containing an anti-evaporation metal formed at least on part of the outer surface of the catalyst metal particles.

The evaporative catalyst metal has a high melting point of about 1,500 to 2,000° C., but the surface thereof is oxidized and turns into an oxide which has a low melting point while being used as the catalyst for purifying an exhaust gas. Since the constitution of the present invention where the catalyst is supported directly on the carrier surface is more liable to the influence of the exhaust gas flow, the catalyst is more likely to evaporate than in the case of the catalyst element of the prior art which is coated with γ-alumina. Therefore, according to the invention, the anti-evaporation metal is provided on the outer surface of the catalyst particles. Such a constitution of the catalyst particle makes it possible to protect the catalyst metal contained inside, suppress oxidization and prevent the catalyst from evaporating. As a result, thermal deterioration can be suppressed and the durability can be greatly improved.

According to a second aspect of the invention, the effects described above can be achieved when the layer containing the anti-evaporation metal covers at least 10% of the outer surface of the catalyst metal particles. Preferably, according to a third aspect of the invention, the layer containing the anti-evaporation metal covers at least 50% of the outer surface of the catalyst metal particles. At this time, according to a fourth aspect of the invention, the layer containing the anti-evaporation metal may be supported in the form of metal on the outer surface of the catalyst metal particles, but may also be provided in the form of an oxide or an alloy so as to have higher melting point which makes the catalyst performance more stable.

According to a fifth aspect of the invention, a noble metal may be used as the catalyst metal and a metal of which the oxide has a high melting point of 1,100° C. or higher may be used for the anti-evaporation metal. At this time, according to a sixth aspect of the invention, it is more desirable that the anti-evaporation metal has catalytic activity. Specifically, according to a seventh aspect of the invention, at least one kind selected from the group consisting of Ti, V, Cr, Mn, Fe, Co, Ni, Cu, Rh, Ta, W and Ir is used as the anti-evaporation metal.

According to an eighth aspect of the invention, when one or more constituent element of the substrate ceramic is substituted with an element other than the constituent element, then a carrier capable of supporting the catalyst metal directly on the substituting element can be used.

In this case, according to a ninth aspect of the invention, the catalyst metal is preferably supported on the substituting element through chemical bonding. Chemical bonding of the catalyst metal improves the retention of the catalyst and reduces the possibility of deterioration through long period of use since the catalyst component is evenly distributed over the carrier and is less likely to coagulate.

According to a tenth aspect of the invention, one or more elements having a d or an f orbit in the electron orbits thereof can be used as the substituting element described above. An element having d or f orbit in the electron orbits thereof has higher tendency to bond with the catalyst metal, and is therefore preferable.

According to an eleventh aspect of the invention, the ceramic carrier has a multitude of pores capable of directly supporting the catalyst on the surface of the substrate ceramic so that the catalyst metal can be supported directly in the pores.

According to a twelfth aspect of the invention, the pores described above comprise at least one kind selected from the group consisting of defects in the ceramic crystal lattice, microscopic cracks in the ceramic surface and missing defects of the elements which constitute the ceramic.

According to a thirteenth aspect of the invention, the microscopic cracks are preferably 100 nm or smaller in width in order to ensure mechanical strength of the carrier.

According to a fourteenth aspect of the invention, the pores have diameter or width preferably 1,000 times the diameter of the catalyst ion to be supported therein or smaller, in order to be capable of supporting the catalyst metal. At this time, a quantity of catalyst metal comparable to that in the prior art can be supported when the density of pores is $1 \times 10^{11}$ /L or higher.

According to a fifteenth aspect of the invention, a ceramic containing cordierite as the main component is used as the substrate ceramic, and the pores may be defects formed by substituting a part of the constituent elements of the cordierite with a metal element having different value of valence. Cordierite has high resistance against thermal shock and is therefore suitable for the catalyst to purify the automobile exhaust gas.

According to a sixteenth aspect of the invention, the defects are at least one or an oxygen defect or a lattice defect. A quantity of catalyst metal comparable to that in the prior art can be supported when the density of cordierite crystal containing at least one defect in a unit crystal lattice of cordierite is set to $4 \times 10^{-6}$% or higher.

According to a seventeenth aspect of the invention, a method of producing the ceramic catalyst body of the invention is provided, wherein a ceramic carrier capable of supporting the catalyst metal directly on the surface of the substrate ceramic is immersed in a solution of a catalyst metal and is then sintered so as to support the catalyst metal on the carrier. Then the carrier is immersed in a solution of an anti-evaporation metal and is then sintered so as to form a layer containing the anti-evaporation metal at least in a part of the outer surface of the catalyst metal particles that are supported on the ceramic carrier.

According to an eighteenth aspect of the invention, a ceramic catalyst body comprising a ceramic carrier capable of supporting a catalyst directly on the surface of a substrate ceramic with a catalyst component supported on the ceramic carrier is provided wherein a trap layer is provided at a position near the end face in the upstream of the flow of gas to be purified so as to trap catalyst poisoning component included in the gas.

With the constitution described above, since the trap layer provided in the upstream side of the catalyst body traps the catalyst poisoning component included in the gas to be purified such as exhaust gas, the catalyst poisoning component can be removed from the gas which enters the catalyst element, thereby preventing the catalyst poisoning from occurring and improving the resistance against catalyst poisoning.

In this case, according to a nineteenth aspect of the invention, the trap layer can be formed by supporting a trapping component, which adsorbs the catalyst poisoning component, on a carrier which is coated with porous ceramic on the surface thereof.

According to a twentieth aspect of the invention, a ceramic catalyst body comprising a ceramic carrier capable of supporting a catalyst directly on the surface of a substrate ceramic and a catalyst component supported on the ceramic carrier is provided, wherein a trapping component which adsorbs catalyst poisoning component included in the gas to be purified is supported at least at the end portion of the carrier in the upstream of the flow of gas to be purified, thereby providing a trap layer that traps the catalyst poisoning component. A similar effect can also be achieved by providing the trap layer integrally with the catalyst element at the end portion in the upstream side thereof.

According to a twenty first aspect of the invention, in case the catalyst component supported by the ceramic carrier includes a main catalyst component made of a noble metal and a promoter component which receives the catalyst poisoning, the promoter component can be used as the trapping component which adsorbs the catalyst poisoning. As the promoter component is apt to react with the catalyst poisoning component, removal thereof in the upstream of the catalyst body results in the reduction of the adverse effect on the main catalyst.

According to a twenty second aspect of the invention, a ceramic catalyst body comprising a ceramic carrier capable of supporting a catalyst directly on the surface of a substrate ceramic and a catalyst component supported on the ceramic carrier is provided, wherein a such a catalyst is provided in an area near the catalyst which receives the catalyst poison, that decomposes a compound generated through reaction with the catalyst poisoning component included in the gas to be purified.

With the constitution described above, the catalyst can be regenerated by decomposing the compound generated by catalyst poisoning instead of preventing the poisoning component from entering the ceramic catalyst. This constitution also makes it possible to prevent the performance from deteriorating due to catalyst poisoning and improve the resistance against catalyst poisoning.

According to a twenty third aspect of the invention, one or more constituent element of the substrate ceramic is substituted with an element other than the constituent element in the ceramic carrier described above, so that the carrier is capable of supporting the catalyst component directly on the substituting element.

In this case, according to a twenty fourth aspect of the invention, the catalyst component is preferably supported on the substituting element through chemical bonding. Chemical bonding of the catalyst component improves the retention of the catalyst and, as the catalyst component is evenly distributed over the carrier and is less likely to coagulate, possibility of deterioration by long period of use is also reduced.

According to a twenty fifth aspect of the invention, one or more element having d or f orbit in the electron orbits thereof can be used as the substituting element described above. An element which has d or f orbit in the electron orbits thereof has higher tendency to bond with the catalyst component, and is therefore preferable.

According to a twenty sixth aspect of the invention, the ceramic catalyst has a multitude of pores capable of directly supporting the catalyst on the surface of the substrate ceramic so that the catalyst component can be supported directly in the pores.

According to a twenty seventh aspect of the invention, the pores described above comprise at least one kind selected from the group consisting of defects in the ceramic crystal lattice, microscopic cracks in the ceramic surface and missing defects of the elements which constitute the ceramic.

According to a twenty eighth aspect of the invention, the microscopic cracks are preferably 100 nm, or smaller, in width in order to ensure mechanical strength of the carrier.

According to a twenty ninth aspect of the invention, the pores have diameter or width preferably 1,000 times the diameter of the catalyst ion to be supported therein, or smaller, in order to be capable of supporting the catalyst component. At this time, a quantity of catalyst component comparable to that supported in the prior art can be supported when the density of pores is $1 \times 10^{11}$ /L or higher.

According to a thirtieth aspect of the invention, a ceramic containing cordierite as the main component is used as the substrate ceramic, and the pores may be defects formed by substituting a part of the constituent elements of the cordierite with a metal element having different value of valence. Cordierite has high resistance against thermal shock and is therefore suitable for the catalyst to purify the automobile exhaust gas.

According to a thirty-first aspect of the invention, the pores are at least one of an oxygen defect or a lattice defect. A quantity of catalyst component comparable to that supported in the prior art can be supported when the density of cordierite crystal containing at least one defect in a unit crystal lattice of cordierite is set to $4 \times 10^{-6}$% or higher.

According to a thirty-second aspect of the invention, the ceramic carrier may have a shape of at least one kind selected from the group consisting of honeycomb, pellet, powder, foam body, fiber or hollow fiber.

According to a thirty-third aspect of the invention, a method is provided to regenerate a ceramic catalyst body which comprises a ceramic carrier capable of supporting a catalyst directly on the surface of a substrate ceramic and a catalyst supported on the ceramic carrier, by providing heating means for heating the carrier and, when the catalyst performance has decreased due to catalyst poisoning, heats the carrier with the heating means thereby to decompose catalyst poisoning component and thereby regenerate the catalyst.

The catalyst poisoning component may also be removed to regenerate the catalyst, also by supplying thermal energy from the outside using the heating means described above so as to decompose a compound generated by poisoning. Poisoning resistance can be improved by restoring the catalytic function through periodical heating.

According to a thirty-fourth aspect of the invention, a method of regenerating the catalyst is provided wherein, when the catalyst performance has decreased due to catalyst poisoning, a catalyst poisoning component is decomposed by putting the catalyst into contact with a solution or gas containing acid or alkali.

A poisoning component may also be removed thereby to restore the catalyst function by dissolving a component subjected to the catalyst poisoning in a solution or gas containing acid or alkali or by decomposing the catalyst poisoning component.

According to a thirty-fifth aspect of the invention, the catalyst poisoning component is dissociated by changing the gas atmosphere when the catalyst performance has decreased due to catalyst poisoning. Specifically, according to a thirty-sixth aspect of the invention, the catalyst poisoning component may be dissociated by exposing the catalyst to reduced pressure atmosphere, low-oxygen atmosphere or reducing atmosphere.

According to a thirty-seventh aspect of the invention, the regeneration process described in the seventeenth or nineteenth aspect is carried out with the ceramic catalyst body being mounted on an apparatus or removed therefrom. While these regeneration processes can be carried out with the ceramic catalyst body being mounted on the apparatus, the ceramic catalyst body may also be taken out of the apparatus to apply the process in case the process causes a significant load on the apparatus.

According to a thirty-eighth aspect of the invention, the catalyst poisoning component deposited on the catalyst is removed by a physical method when the catalyst performance has decreased due to catalyst poisoning. Specifically, according to a thirty ninth aspect of the invention, the physical method may be either to apply vibration to the catalyst, blow the catalyst with a gas, wash the catalyst with a solution or remove the poisoning component by brushing.

According to a fortieth aspect of the invention, the physical method may be applied either intermittently or continuously. According to a forty first aspect of the invention, the physical method is suitable for a ceramic catalyst body which comprises a ceramic carrier that has an element capable of directly supporting a multitude of catalyst particles provided on the surface, whereon the catalyst is supported directly on the ceramic carrier. Since the bonding force of the catalyst particles supported directly on the element is stronger than that of the catalyst particles supported in the pores, the influence caused by the physical force on the catalyst can be mitigated.

DESCRIPTION OF THE PREFERRED EMBODIMENTS

An embodiment of the invention wherein a layer containing an anti-evaporation metal is provided on the outer surface of catalyst metal particles will be described below. According to the invention, a ceramic carrier capable of directly supporting the catalyst component is used, and a ceramic catalyst is made by having a catalyst supported on the ceramic carrier. The catalyst supported has such a constitution as the anti-evaporation metal is provided on the outer surface of catalyst metal particles, which will be described in detail later. The ceramic carrier is based on substrate ceramic made preferably from cordierite having theoretical composition of $2MgO.2Al_2O_3.5SiO_2$ as the main component, which is formed in honeycomb structure to make the ceramic carrier. Main component of the ceramic may also be other ceramic materials such as alumina, spinel, aluminum titanate, silicon carbide, mullite, silica-alumina, zeolite, zirconia, silicon nitride, zirconium phosphate, besides cordierite. Shape of the ceramic carrier is not limited to honeycomb structure and may also be other shapes such as pellet, powder, foam body, hollow fiber or fiber.

The ceramic catalyst has a multitude of pores or element capable of directly supporting the catalyst on the surface of the substrate ceramic so that the catalyst metal can be supported directly in the pores or on the element. The element capable of directly supporting the catalyst is an element introduced by substituting one or more element among the constituent elements of the ceramic substrate with an element other than the constituent element, which will be described in detail later.

First, the ceramic carrier which has a multitude of pores that are capable of directly supporting the catalyst component provided on the surface of the ceramic substrate will be described below. The pores comprise at least one kind selected from the group consisting of defects in the ceramic crystal lattice (oxygen defect or lattice defect), microscopic cracks in the ceramic surface and missing defects of the elements which constitute the ceramic. It suffices that at least one kind of these pores be formed in the ceramic carrier, while two or more of kinds thereof may also be formed in combination. In order to make it possible to support the catalyst component without forming a coating layer of a material which has large specific surface area such as γ-alumina, diameter or width of the pores formed on the cordierite surface is not larger than 1,000 times (100 nm) the diameter of the ions of the catalyst component to be supported therein (typically about 0.1 nm), preferably in a range from 1 to 1,000 times (0.1 to 100 nm). Depth of the pore is preferably a half the diameter of the catalyst ion or larger, typically 0.05 nm or larger. In order to support the catalyst component in a quantity comparable to that of the prior art (1.5 g/L) with the pores of the dimensions described above, density of the pores is $1\times10^{11}$ /L or higher, preferably $1\times10^{16}$ /L or higher and more preferably $1\times10^{17}$ /L or higher.

Among the pores formed in the ceramic surface, the defects in the crystal lattice are classified into an oxygen defect and a lattice defect (metal vacancy and lattice strain). An oxygen defect is caused by the lack of oxygen atoms which constitute the crystal lattice of the ceramic, and allows it to support the catalyst component in the vacancy left by the missing oxygen. A lattice defect is caused by trapping of more oxygen atoms than necessary to form the ceramic crystal lattice, and allows it to support the catalyst component in the pores formed by the strains in the crystal lattice or the metal vacancies.

Oxygen defects may be formed in the crystal lattice as described in Japanese Patent Application No. 2000-104994, in a process after forming and degreasing, by sintering a material for cordierite containing an Si source, an Al source and an Mg source while either ① decreasing the pressure of the sintering atmosphere or making it a reducing atmosphere; ② sintering in a low-oxygen concentration atmosphere using a compound which does not include oxygen for at least a part of the raw material so as create oxygen deficiency in the sintering atmosphere or in the starting material; or ③ substituting at least one of the constituent elements of the ceramic except for oxygen with an element having a value of valence lower than that of the substituted element. In the case of cordierite, since the constituent elements have positive valence such as Si (4+), Al (3+) and Mg (2+), substituting these elements with an element of lower value of valence leads to deficiency of positive charge which corresponds to the difference from the substituting element in the value of valence and to the amount of substitution. Thus O (2−) having negative charge is released so as to maintain the electrical neutrality of the crystal lattice, thereby forming the oxygen deficiency.

Lattice defects can be formed by ④ substituting a part of the constituent elements of the ceramic except for oxygen with an element which has a value of valence higher than that of the substituted element. When at least part of the Si, Al and Mg which are constituent elements of the cordierite is substituted with an element having a value of valence higher than that of the substituted element, a positive charge which corresponds to the difference from the substituting element in the value of valence and to the amount of substitution becomes redundant, so that the required amount of O (2−) having negative charge is taken into the lattice in order to maintain the electrical neutrality of the crystal lattice. The oxygen atoms which have been taken into the crystal make an obstacle for the cordierite unit crystal lattice to form an orderly structure, thus resulting in the lattice strain. Alternatively, part of Si, Al and Mg is released to maintain the electrical neutrality of the crystal lattice, thereby forming vacancies. In this case, sintering is carried out in an air atmosphere so as to supply a sufficient amount of oxygen. Since the sizes of these defects are believed to be on the order of several angstroms or smaller, they are not accounted for in the specific surface area measured by ordinary methods such as BET method which uses nitrogen molecules.

The number of oxygen defects and lattice defects is related to the amount of oxygen included in the cordierite honeycomb structure, and it is possible to support the required quantity of catalyst component by controlling the amount of oxygen to below 47% by weight (oxygen defect) or over 48% by weight (lattice defect). When the amount of oxygen is decreased to below 47% by weight due to the formation of oxygen defects, the number of oxygen atoms included in the cordierite unit crystal lattice becomes less than 17.2, and the lattice constant for $b_o$ axis of the cordierite crystal becomes smaller than 16.99. When the amount of oxygen is increased above 48% by weight due to the formation of the lattice defects, number of oxygen atoms included in the cordierite unit crystal lattice becomes larger than 17.6, and the lattice constant for $b_o$ axis of the cordierite crystal becomes larger or smaller than 16.99.

A predetermined number of or more pores can be formed in the ceramic carrier, when the density of cordierite crystal containing at least one defect of at least one kind, oxygen defect or lattice defect, in a unit crystal lattice of cordierite is set to $4\times10^{-6}$% or higher, and preferably $4\times10^{-5}$% or higher, or alternatively, $4\times10^{-6}$ or more, preferably $4\times10^{-7}$ or more defects of at least one kind, oxygen defect or lattice defect, are included in a unit crystal lattice of cordierite.

Among the pores which can support the catalyst, microscopic cracks in the ceramic surface are formed in a multitude at least in one of amorphous phase and crystal phase by applying thermal shock or shock wave to the cordierite honeycomb structure. The cracks are required to be small, about 100 nm or less, preferably 10 nm or smaller in width in order to ensure mechanical strength of the honeycomb structure.

Thermal shock can be applied by quenching the cordierite honeycomb structure which has been heated. The timing of applying the thermal shock may be after the time when the cordierite crystal phase or amorphous phase has been formed in the cordierite honeycomb structure. Thermal shock may be applied either by forming, degreasing and sintering a material for cordierite containing an Si source, an Al source and an Mg source in an ordinary process, heating the cordierite honeycomb structure thus formed to a predetermined temperature again and then quenching it, or by quenching from a predetermined temperature during the transition from sintering to cooling. Cracks due to thermal shock can be generated when the temperature difference (thermal shock temperature difference) is about 80° C. or larger between the time of heating and after quenching, while the crack size increases as the thermal shock temperature difference increases. The thermal shock temperature difference should be kept within about 900° C. since large cracks make it difficult to maintain the shape of the honeycomb structure.

In the cordierite honeycomb structure, the amorphous phase exists in the form of layers formed around the crystal phase. When thermal shock is applied by heating and then quenching the cordierite honeycomb structure, since there is a difference in the thermal expansion coefficient between the amorphous phase and the crystal phase, a thermal stress corresponding to the difference in the thermal expansion coefficient and to the thermal shock temperature difference is generated around the interface between the amorphous phase and the crystal phase. When the amorphous phase or the crystal phase is unable to endure the thermal stress, microscopic cracks are generated. The number of microscopic cracks generated can be controlled by the amount of amorphous phase. When a trace component (alkali metal element, alkali earth metal element, etc.) included in the raw material which is believed to contribute to the formation of the amorphous phase is added in a quantity larger than normal, the number of cracks generated is increased. Shock wave of ultrasound or vibration can also be used instead of thermal shock. When a weak portion of the cordierite honeycomb structure is unable to endure the shock wave, microscopic cracks are generated. The number of cracks generated can be controlled by the energy of the shock wave.

Among the pores which can support the catalyst, missing defects of the elements which constitute the ceramic are formed through elution of the constituent element of the cordierite or an impurity by a liquid phase method and, for example, the defects are formed when metal elements such as Mg and Al included in the cordierite crystal, alkali metal or alkali earth metal included in the amorphous phase or the amorphous phase itself dissolves into water of high temperature and high pressure, super-critical fluid or into a solution such as alkali solution. Missing defects of these elements form pores which support the catalyst. The defects may also be formed chemically or physically by gas phase method. A chemical method includes dry etching and a physical method includes sputter etching, in which case the number of pores can be controlled by regulating the duration of etching or the amount of energy supplied.

A carrier having a multitude of particles of elements which are capable of supporting the catalyst component directly on the surface of the substrate ceramic being provided by the substitution of elements will be described below. In this case, constituent elements of the ceramic (for example Si, Al and Mg in the case of cordierite) are substituted with such an element that has greater force for bonding with the catalyst than the constituent element to be substituted and is capable of supporting the catalyst component by chemical bonding. Specifically, the substituting elements may be those which are different from the constituent elements and have a d or an f orbit in the electron orbits thereof, and preferably have empty orbit in the d or f orbit or have two or more oxidation states. An element which has empty orbit in the d or f orbit has energy level near that of the catalyst being supported, which means a higher tendency to exchange electrons and bond with the catalyst component. An element which has two or more oxidation states also has higher tendency to exchange electrons and provides the same effect.

Elements which have empty orbits in the d or f orbit include W, Ti, V, Cr, Mn, Fe, Co, Ni, Zr, Mo, Ru, Rh, Ce, Ir, Pt, etc. of which one or more can be used. Among these, W, Ti, V, Cr, Mn, Fe, Co, Mo, Ru, Rh, Ce, Ir and Pt are elements which have two or more oxidation states. Besides these, elements which have two or more oxidation states include Cu, Ga, Ge, Se, Pd, Ag, Au, etc.

When substituting the constituent element of the ceramic with these substituting elements, a method may be employed where the substituting element is added to the ceramic material and mixed, as described above. However, such a method may also be employed where the material including the constituent element to be substituted is reduced by the amount corresponding to the amount of substitution, followed by mixing, forming and drying, before being immersed in a solution containing the substituting element thereby to be impregnated therewith. The material is taken out of the solution, dried and then subjected to degreasing and sintering in air atmosphere. This method of impregnating the preform is preferably employed, since the substituting element can be deposited sufficiently on the surface of the preform and, as a result, the element is substituted on the surface during sintering, thus making it easier for a solid solution to form.

The amount of substituting element is set within a range from 0.01% to 50%, and preferably in a range from 5 to 20% of the substituted constituent element in terms of the number of atoms. In case the substituting element has a value of valence different from that of the constituent element of the substrate ceramic, lattice defects or oxygen defects are generated at the same time depending on the difference in the valence, as described above. The defects can be prevented from occurring by using a plurality of substituting elements and setting the sum of oxidation numbers of the substituting elements equal to the sum of oxidation numbers of the substituted constituent elements. Thus the catalyst component may be supported only by bonding with the substituting elements while keeping the valence constant as a whole.

The ceramic catalyst body of the invention comprises a ceramic carrier which has a multitude of pores on the surface thereof, with a catalyst component supported directly on the ceramic carrier, and is preferably used in catalyst for purifying an engine exhaust gas or the like. The invention is characterized in that the catalyst particles are provided with a layer containing an anti-evaporation metal formed at least in part of the outer surface of the catalyst metal particles, thereby improving the resistance of the catalyst against evaporation. A noble metal catalyst such as Pt, Pd, Ir or Rh is usually used as the catalyst metal. For the anti-evaporation metal, a metal having high melting point of which oxide has a high melting point of 1,100° C. or higher may be used. For example, at least one kind selected from the group consisting of Ti, V, Cr, Mn, Fe, Co, Ni, Cu, Rh, Ta, W and Ir is used. Among these, Rh, Mn, Ni, Cu, etc. are more preferable since the anti-evaporation metal itself has catalytic activity.

The layer containing the anti-evaporation metal can be formed on the outer surface of the catalyst metal particles as described below. First, the ceramic carrier which has a multitude of pores in the surface is immersed in a solution containing a catalyst metal such as a noble metal, and is then sintered to fix the catalyst metal on the ceramic carrier. Then the ceramic carrier supporting the catalyst metal is immersed in a solution containing the anti-evaporation metal, and is then sintered thereby to form the layer containing an anti-evaporation metal covering the outer surface of the catalyst metal particles. While the solvent used for the impregnation of the catalyst component may be water, a solvent having a smaller surface tension, for example alcohol solvent such as ethanol, is more preferably used, since the defects or cracks which constitute the pores formed in the ceramic carrier have a microscopic size. While a solvent which has large surface tension such as water cannot easily infiltrate into the pores and is unable to fully make use of the pores, use of the solvent having smaller surface tension which can infiltrate into microscopic pores makes it possible to carry 0.5 g/L or more catalyst component by making full use of the pores. $CeO_2$ or the like can be used as a promoter, which may be deposited on the carrier either simultaneously with the catalyst metal or the anti-evaporation metal, or in a separate process.

In order to achieve the effects described above, it is desirable that the layer containing an anti-evaporation metal covers 10% or more, or preferably 50% or more of the outer surface of the catalyst metal particles. While a greater effect of preventing the evaporation can be achieved when a larger portion of the outer surface is covered, it also decreases the permeability of gas thus making it difficult for the exhaust gas to reach the catalyst metal. Therefore, it is desired to provide the layer containing the anti-evaporation metal so that both anti-evaporation effect and gas permeability can be obtained at the same time. Also the anti-evaporation metal may be supported in the form of metal on the outer surface of the catalyst metal particles, but may also be provided in the form of an oxide or an alloy to have higher melting point which achieves greater effect. The anti-evaporation metal is easily turned into an oxide when sintered in air atmosphere in the forming method described above. When used in the form of an alloy, the alloy made by processing the anti-evaporation metal and other metal at a high temperature is turned into fine particles which are immersed in a solution including an alloy of the anti-evaporation metal and the sintered by a method similar to that described above.

Figure 1:
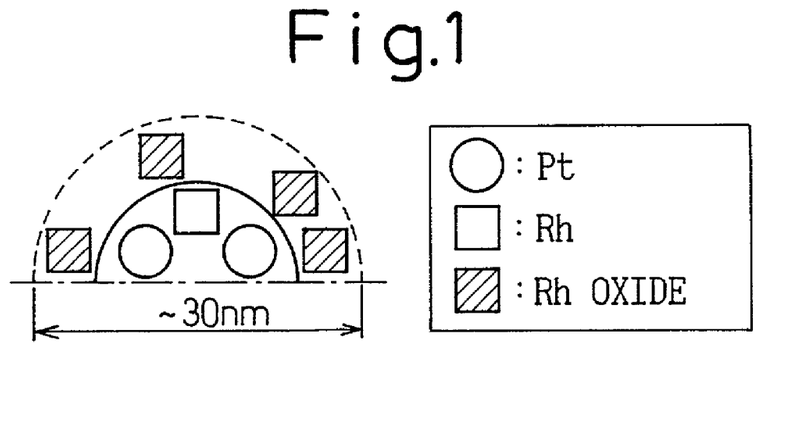
FIG. 1 schematically shows the shape of catalyst particles supported on a ceramic catalyst body of the invention.

Specifically, for example, the carrier is immersed in ethanol solution including 0.07 mol/L of Pt (chloroplatinate) and 0.05 mol/L of Rh (rhodium chloride) and is then dried. The carrier is then immersed in ethanol solution including 0.05 mol/L of Rh (rhodium chloride) and is dried before being sintered at a temperature of 500 to 900° C. FIG. 1 schematically shows the constitution of the catalyst particles obtained as described above, where the particles which include Pt and Rh as the catalyst metals are supported on the carrier surface with a layer of Rh oxide used as the anti-evaporation metal is formed to cover the outer surface thereof so as to hold the catalyst metal particles thereby to prevent evaporation. Observation of the surface of the catalyst particles obtained by the method described above showed that the layer of Rh oxide covered 50% of the outer surface of the catalyst metal particles. The layer of Rh oxide allows sufficient flow of gas therethrough, and does not impede the contact between the exhaust gas and the catalyst metal. The layer of Rh oxide is formed by carrying out the sintering process in the air atmosphere after depositing the anti-evaporation metal. Although it is not necessary to form the layer of the anti-evaporation metal from oxide of the metal, oxidizing the Rh atoms in the outermost layer in advance increases the melting point resulting in more stable catalyst performance.

Figure 2:
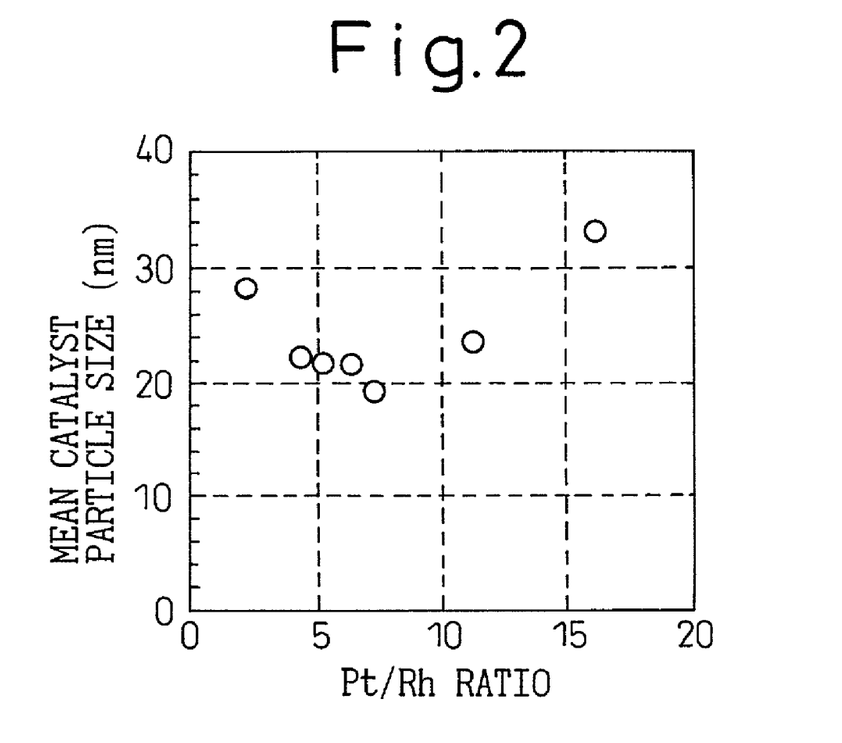
FIG. 2 shows the relation between Pt/Rh ratio and the mean catalyst particle size.
Figure 3:
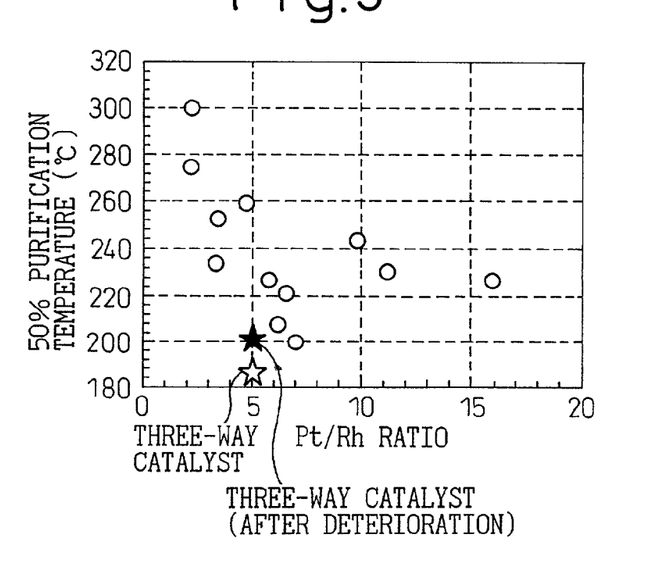
FIG. 3 shows the relation between Pt/Rh ratio and the 50% purification temperature.

Sizes of the catalyst particles are normally within 75 nm, preferably in a range from 10 to 35 nm. The catalyst particles obtained by the method described above have sizes in a range from 25 to 35 nm, while the catalyst particles size varies depending on the ratio of Pt:Rh, sintering temperature and other factors. FIG. 2 shows the relation between the Pt/Rh ratio and the mean catalyst particle size. Mean catalyst particle size in the range described above can be usually obtained when the Pt/Rh ratio is 15/1 or below, preferably in a range from 4/1 to 10/1. High purification performance can be achieved in this range as shown in FIG. 3. In FIG. 3, the 50% purification temperature plotted along the ordinate is used as an index to evaluate the purification performance, and was determined by introducing a model gas including HC (hydrocarbon) into samples (measuring Φ15×L10 mm) of the ceramic catalyst to be evaluated and, while raising the sample temperature gradually, as the temperature at which the HC purification ratio reached 50%.

FIG. 3 also shows the 50% purification temperature of a three-way catalyst (supporting catalyst deposited on γ-alumina coat) of the prior art in an early stage and after deterioration test (1,000° C. for 24 hours), indicating that the catalyst performance is decreased due to deterioration through evaporation. In contrast, in a similar deterioration test conducted on a sample of the ceramic catalyst body of the invention, no significant change was observed in 50% purification temperature. Thus it was confirmed that the layer including the anti-evaporation metal improved the anti-evaporation performance of the catalyst, suppressing the deterioration.

With the method described above, the layer of the anti-evaporation metal containing Rh is formed on the outside of Pt/Rh by supporting a part of Rh together with Pt since Rh has catalytic activity, although Rh may also be deposited after depositing Pt only. For example, the carrier is immersed in ethanol solution including 0.07 mol/L of Pt (chloroplatinate) and is then dried and sintered at a temperature of 500 to 900° C. thereby to fix Pt. Then the carrier is immersed in ethanol solution including 0.05 mol/L of Rh (rhodium chloride) and is then dried and sintered at a temperature of 500 to 900° C. in air. This process produces catalyst particles having the layer of the anti-evaporation metal containing Rh being formed on the outside of Pt.

The proportions of combining the catalyst metal and the anti-evaporation metal may be determined as required. For example, by using Ir as the catalyst metal, the layer of the anti-evaporation metal containing Rh may be formed on the outside thereof. In this case, Ir/Rh ratio is preferably in a range from 5/1 to 30/1.

Figures 4A, 4B:
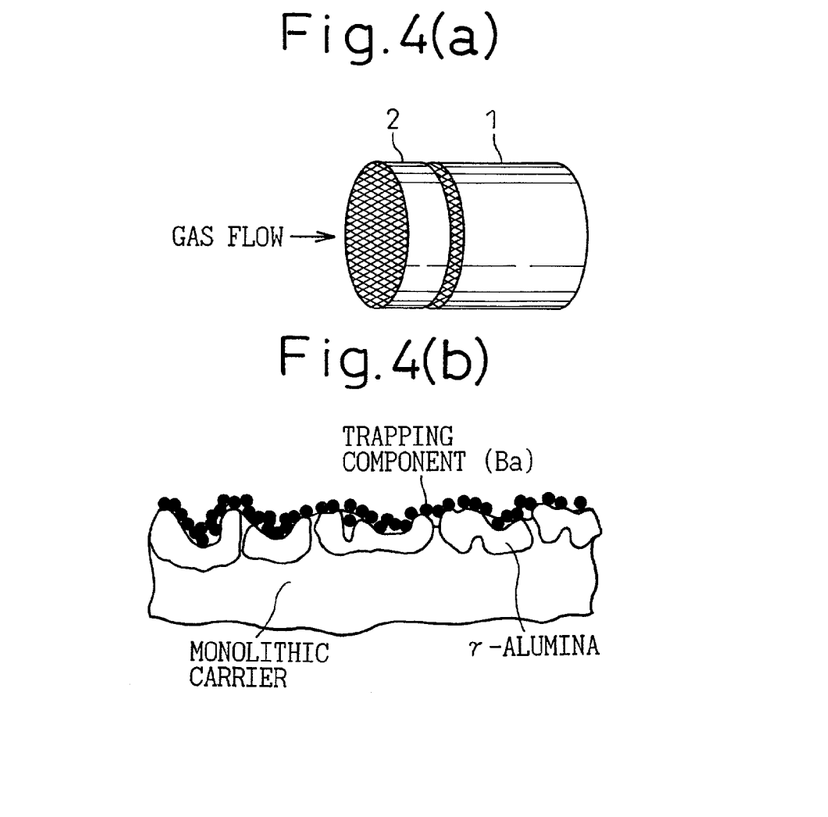
FIG. 4(a) is a perspective view showing the arrangement of a trap layer and a ceramic catalyst body according to Example 1 of the invention.
FIG. 4(b) is a partially enlarged view thereof.

Now an embodiment of the invention, where a trap layer is provided for trapping catalyst component included in the gas to be purified, will be described below. As a matter of course, this aspect can be combined with the other aspect of the invention, wherein the layer containing the anti-evaporation metal is provided, as described above. In FIG. 4(a), a ceramic catalyst body 1 of the invention is used for NOx occluding reduction catalyst or the like and is made by having a catalyst supported on the ceramic carrier capable of supporting catalyst directly on the substrate ceramic surface. A catalyst poison trapping layer 2 is disposed in the upstream near the catalyst. The ceramic carrier of the ceramic catalyst body 1 is based on substrate ceramic made preferably from cordierite having theoretical composition of $2MgO.2Al_2O_3.5SiO_2$ as the main component, which is formed in honeycomb structure and sintered to make the ceramic carrier.

Main component of the ceramic may also be other ceramic materials than cordierite such as alumina, spinel, aluminum titanate, silicon carbide, mullite, silica-alumina, zeolite, zirconia, silicon nitride and zirconium phosphate. Shape of the ceramic carrier is not limited to honeycomb structure and may also be other shapes such as pellet, powder, foam body, hollow fiber or fiber.

The ceramic carrier has a multitude of pores or elements which are capable of directly supporting the catalyst component on the surface of the ceramic substrate, and can support the catalyst metal on the pores or element. The pores comprise at least one kind selected from the group consisting of defects in the ceramic crystal lattice (oxygen defect or lattice defect), microscopic cracks in the ceramic surface and missing defects of the elements which constitute the ceramic, or may comprise two or more of kinds thereof combined. The element capable of directly supporting the catalyst is an element introduced by substituting one or more element among the constituent elements of the ceramic substrate with an element other than the constituent element. By means of such pores or element described above, the catalyst component can be supported without forming a coating layer of a material which has large specific surface area such as γ-alumina.

For an application to the NOx occluding reduction catalyst, a noble metal as a main catalyst component and a metal having NOx occluding capacity as a promoter component are usually supported. For the metal having NOx occluding capacity, alkali metal, alkali earth metal, rare earth or transition metal may be used. A method of having the catalyst components supported will be described later.

Now the ceramic carrier which has a multitude of pores capable of directly supporting the catalyst component on the surface of the ceramic substrate will be described below. Since diameter of the ions of the catalyst component to be supported is typically around 0.1 nm, the catalyst component ions can be supported in pores measuring 0.1 nm or larger in diameter or width which are formed in the surface of cordierite. In order to ensure the strength of the ceramic, the diameter or the width of the pores is as small as possible and not larger than 1,000 times (100 nm) the diameter of the ions of the catalyst component to be supported therein, preferably in a range from 1 to 1,000 times (0.1 to 100 nm). The depth of the pore is preferably a half (0.05 nm) the diameter of the catalyst ion or larger. In order to support the catalyst component in a quantity comparable to that of the prior art (1.5 g/L) with the pores of the dimensions described above, density of the pores is $1\times10^{11}$ /L or higher, preferably $1\times10^{16}$ /L or higher and more preferably $1\times10^{17}$ /L or higher.

Among the pores formed in the ceramic surface, the defects in the crystal lattice are classified into an oxygen defect and a lattice defect (metal vacancy and lattice strain). An oxygen defect is caused by the lack of oxygen atoms which constitute the crystal lattice of the ceramic, and allows it to support the catalyst component in the vacancy left by the missing oxygen. A lattice defect is caused by trapping more oxygen atoms than necessary to form the ceramic crystal lattice, and allows it to support the-catalyst component in the pores formed by the strains in the crystal lattice or the metal vacancies.

Predetermined number of or more pores can be formed in the ceramic carrier, when the cordierite honeycomb structure is constituted from cordierite crystal containing at least one defect of at least one kind, oxygen defect or lattice defect, with density in a unit crystal lattice of cordierite being set to $4\times10^{-6}\%$ or higher, and preferably $4\times10^{-5}\%$ or higher, or alternatively, $4\times10^{-6}$ or more, preferably $4\times10^{-7}$ or more defects of at least one kind, an oxygen defect or a lattice defect, are included in a unit crystal lattice of cordierite. Details of the pores and the method of forming the same are similar to those described previously.

That is, oxygen defects can be formed in the crystal lattice by using the methods ① to ④ described in Japanese Patent Application No. 2000-104994.

The number of oxygen defects and lattice defects is related to the amount of oxygen included in the cordierite, and it is made possible to support the required quantity of a catalyst component by controlling the amount of oxygen to below 47% by weight (oxygen defect) or to over 48% by weight (lattice defect). When the amount of oxygen is decreased to below 47% by weight due to the formation of oxygen defects, the number of oxygen atoms included in the cordierite unit crystal lattice becomes less than 17.2, and the lattice constant for $b_o$ axis of the cordierite crystal becomes smaller than 16.99. When the amount of oxygen is increased above 48% by weight due to the formation of the lattice defects, number of oxygen atoms included in the cordierite unit crystal lattice becomes larger than 17.6, and the lattice constant for $b_o$ axis of the cordierite crystal becomes larger or smaller than 16.99.

Among the pores which can support the catalyst, microscopic cracks in the ceramic surface are formed in a multitude at least in one of amorphous phase and crystal phase by applying thermal shock or shock wave to the cordierite honeycomb structure. The cracks are required to be small, about 100 nm or less, preferably 10 nm or smaller in width in order to ensure mechanical strength of the honeycomb structure.

Thermal shock can be applied by quenching a cordierite honeycomb structure which has been heated. The time of applying the thermal shock may be after the time when the cordierite crystal phase and the amorphous phase have been formed in the cordierite carrier. Thermal shock may be applied either by forming, degreasing and sintering a material for cordierite containing an Si source, an Al source and an Mg source in an ordinary process, heating the cordierite carrier thus formed to a predetermined temperature again and then quenching it, or by quenching from a predetermined temperature during the transition from sintering to cooling. Cracks due to thermal shock can be generated when the temperature difference (thermal shock temperature difference) is about 80° C. or larger between the time of heating and after quenching, while the crack size increases as the thermal shock temperature difference increases. The thermal shock temperature difference should be kept within about 900° C. since too large cracks make it difficult to maintain the shape of the honeycomb structure.

In the cordierite carrier, the amorphous phase exists in the form of layers formed around the crystal phase. When thermal shock is applied by heating and then quenching the cordierite carrier, since there is a difference in the thermal expansion coefficient between the amorphous phase and the crystal phase, a thermal stress corresponding to the difference in the thermal expansion coefficient and to the thermal shock temperature difference is generated around the interface between the amorphous phase and the crystal phase. When the amorphous phase or the crystal phase is unable to endure the thermal stress, microscopic cracks are generated. A shock wave of ultrasound or vibration can also be used instead of thermal shock. When a weak portion of the cordierite structure is unable to endure the shock wave, microscopic cracks are generated. The number of cracks generated can be controlled by the energy of the shock wave.

Among the pores which can support the catalyst, missing defects of the elements which constitute the ceramic are formed through elution of the constituent element of the cordierite, or impurity, by liquid phase method, for example, and the defects are formed when metal elements such as Mg and Al included in the cordierite crystal, alkali metal or alkali earth metal included in the amorphous phase or the amorphous phase itself dissolve into water of high temperature and high pressure, super-critical fluid or into a solution such as alkali solution, thus forming pores constituted from these defects which can support the catalyst. The defects may also be formed chemically or physically by a gas phase method. The chemical methods include dry etching and the physical methods include sputter etching, in which case the number of pores can be controlled by regulating the duration of etching or the amount of energy supplied.

A ceramic carrier having a multitude of particles of elements capable of supporting the catalyst component directly on the surface of the substrate ceramic through the substitution of elements may also be used. In this case, constituent elements of the ceramic, for example Si, Al and Mg in the case of cordierite, are substituted with such an element that has greater force for bonding with the catalyst than the constituent element to be substituted and is capable of supporting the catalyst component by chemical bonding. Specifically, the substituting element may be those which are different from the constituent elements and have a d or an f orbit in the electron orbits thereof, and preferably have empty orbit in the d or f orbit or have two or more oxidation states. An element which has empty orbit in the d or the f orbit has energy level near that of the catalyst being supported, which means higher tendency to exchange electrons and bond with the catalyst component. An element which has two or more oxidation states also has a higher tendency to exchange electrons and provides the same effect.

Elements which have an empty orbit in the d or the f orbit include W, Ti, V, Cr, Mn, Fe, Co, Ni, Zr, Mo, Ru, Rh, Ce, Ir, Pt, etc. of which one or more can be used. Among these, W, Ti, V, Cr, Mn, Fe, Co, Mo, Ru, Rh, Ce, Ir and Pt are elements which have two or more oxidation states. Besides these, elements which have two or more oxidation states include Cu, Ga, Ge, Se, Pd, Ag, Au, etc.

When substituting the constituent element of the ceramic with these substituting elements, a method may be employed where the substituting element is added to the ceramic material and mixed, as described above. However, a method may also be employed where the material including the constituent element to be substituted is reduced by the amount corresponding to the amount of substitution, followed by mixing, forming and drying, before being immersed in a solution containing the substituting element thereby to be impregnated therewith. The material is taken out of the solution, dried and then subjected to degreasing and sintering in air atmosphere. This method of impregnating the preform is preferably employed, since the substituting element can be deposited sufficiently on the surface of the preform and, as a result, the element is substituted on the surface during sintering, thus making it easier for a solid solution to form.

The amount of substituting element is set within a range from 0.01% to 50%, and preferably in a range from 5 to 20% of the substituted constituent element in terms of the number of atoms. In case the substituting element has a value of valence different from that of the constituent element of the ceramic, lattice defects or oxygen defects are generated at the same time depending on the difference in the valence, as described above. The defects can be prevented from occurring by using a plurality of substituting elements and setting the sum of oxidation numbers of the substituting elements equal to the sum of oxidation numbers of the substituted constituent elements. Thus the catalyst component may also be supported by only bonding with the substituting elements while keeping the valence constant as a whole.

The ceramic catalyst body 1 used in making the NOx occluding reduction catalyst can be easily obtained by supporting a noble metal such as Pt, Rh or Pd as the main catalyst component and a metal having NOx occluding capacity as a promoter component on the ceramic carrier described above. The metal elements which have NOx occluding capacity include alkali metal elements such as Na, K, Rb, Cs and Fr, alkali earth metal elements such as Mg, Ca, Sr, Ba and Ra, and the ceramic carrier can be rendered the NOx occluding capacity by using at least one kind selected from among these metal elements. NOx occluding capacity can also be realized by using rare earth elements such as Sc, Y, La and Ce, or transition metal elements such as Cr, Mn, Fe, Co, Ni, Cu and Zr.

The catalyst component is supported by immersing the cordierite honeycomb structure in a solution of the catalyst component dissolved in a solvent. This causes the catalyst component to be held in the pores such as lattice defects or cracks, or the catalyst component is chemically bonded with the substituting elements, thus making it possible to support 0.1 g/L or more catalyst component without forming a coating layer of γ-alumina. While water may be used as the solvent for supporting the catalyst component, the use of a solvent having smaller surface tension than water, such as alcohon solvent such as ethanol is more preferable. Although a solvent which has large surface tension such as water does not infiltrate into the pores and is unable to make full use of the pores, a solvent having smaller surface tension can infiltrate into microscopic pores. The carrier impregnated with the catalyst component is then dried and sintered at a temperature from 500 to 800° C.

If a metal element which has NOx occluding capacity is deposited on the ceramic carrier as the promoter component by the method described above, it may be carried out either at the same time as the main catalyst component is deposited, or in a separate process. As an alternative method of depositing the metal element which has NOx occluding capacity is deposited on the ceramic carrier, a metal element which has NOx occluding capacity may be used as the substituting element for forming the pores or a metal element which has NOx occluding capacity may be used as the substituting element for chemically bonding the catalyst component, in case the pores in the ceramic carrier comprise defects in the crystal lattice.

When this method is employed, the process of depositing the metal element which has NOx occluding capacity can be omitted.

Values of valence of the alkali metal elements such as K and the alkali earth metal elements such as Ba which have NOx occluding capacity are 1+ and 2+, respectively. As a result, when these elements are included in the ceramic by substituting the constituent element of the ceramic which has different value of valence, an imbalance is caused in the oxygen content as the change in the valence is compensated for similarly to the methods ③ and ④ of forming defects which make the pores described previously, thus resulting in the formation of oxygen defects or lattice defects in the crystal lattice. In the case of cordierite, since the constituent elements have values of valence such as Si (4+), Al (3+) and Mg (2+), substituting these elements with an element of higher value of valence by using an alkali metal element or an alkali earth metal element as the defect forming element leads to the formation of pores comprising oxygen defects and the development of NOx occluding capacity. Substitution may be carried out similarly to the methods ③ and ④ described above, and such a cordierite material may be used as at least part of the Si source and the Al source is replaced by a compound of a defect-forming element.

The alkali metal elements such as K and the alkali earth metal elements such as Ba used as the promoter component react with NOx included in the exhaust gas to form a nitrate thereby adsorbing NOx, and releases NOx in reducing atmosphere. If sulfur, which becomes a catalyst poison, is included in the exhaust gas, however, there is such a problem that these elements react with the sulfur to form sulfate thus losing the NOx occluding capacity.

To solve the problem described above, according to the invention, a trap layer 2 is provided at a position near the end face of the ceramic catalyst body 1 in the upstream for trapping catalyst poisoning component included in the gas to be purified. Here the trap layer 2 is formed by coating a honeycomb carrier, which has been made by the ordinary method without forming pores in the surface, with a thin layer of porous ceramic such as γ-alumina and depositing a trapping component which adsorbs the catalyst poisoning component hereon, as shown in FIG. 4(b). Formation of the coating layer makes it easier to trap the poisoning component. The ceramic carrier is preferably made from cordierite as the main component, which is formed in honeycomb structure of the same shape as the ceramic catalyst body 1 and is sintered to make the ceramic carrier. Length of the carrier in the direction of flow is normally made smaller than the ceramic catalyst body 1.

For the trapping component which traps the poisoning component, an alkali metal element, an alkali earth metal element or the like, which is a promoter component, is preferably used as long as it is a component which receives the catalyst poisoning, namely the NOx occluding reduction catalyst. If an alkali earth metal element Ba is used as the promoter component in the ceramic catalyst body 1, for example, a constitution may be employed where Ba is used also as the trapping component which traps the catalyst poisoning component and is deposited at the same time as the coating layer of γ-alumina is formed on the surface of the ordinary honeycomb carrier as shown in FIG. 4(b). Deposition can be done by dissolving a compound of Ba such as barium nitrate in an aqueous solution of γ-alumina and mixed, into which a honeycomb carrier is immersed. The honeycomb is then dried and sintered at a temperature from 500 to 800° C., thereby to make the trap layer 2. The coating layer is formed to a small thickness of about 1 μm.

With the trap layer 2 disposed in the upstream of the ceramic catalyst body 1 (FIG. 4(a)), sulfur, which is a poisoning component included in the exhaust gas, is adsorbed by Ba that is liable to the catalyst poisoning, thus trapping the sulfur in the form of barium sulfide. Since the catalyst poisoning component included in the gas can be removed from the gas which enters the ceramic catalyst body 1, catalyst poisoning of Ba supported as the promoter component on the ceramic catalyst body 1 can be prevented and the resistance against catalyst poisoning is improved. The quantity of the trapping component supported on the trap layer 2 for adsorbing the catalyst poisoning component is preferably set to not less than 20 mol % of the catalyst metal of the ceramic catalyst body 1. This is because deterioration of the ceramic catalyst body 1 normally leads to a decrease of purification performance by about 20% and a trapping component of at least 20 mol % is required when it is assumed that the decrease of purification performance is caused solely by catalyst poisoning.

Figures 5A, 5B:
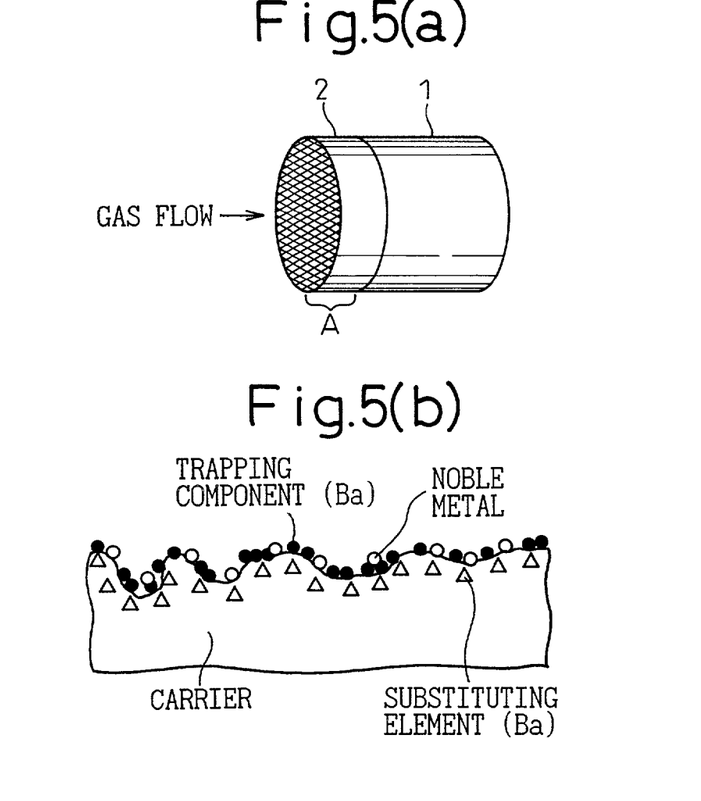
FIG. 5(a) is a perspective view showing the arrangement of a trap layer and a ceramic catalyst body according to Example 2 of the invention.
FIG. 5(b) is a partially enlarged view thereof.

The trap layer 2 may also be provided integrally with the ceramic catalyst body 1 as shown in FIG. 5(a). In this case, the trapping component which adsorbs the catalyst poisoning component is supported along with the other catalyst directly on the carrier of the ceramic catalyst body 1. While the trap layer 2 is made by supporting the trapping component which adsorbs the catalyst poisoning component at an upstream end portion A of the carrier in this case, the trapping component may also be distributed and supported on all over the carrier, or provided in concentration which changes from the upstream to the downstream side (high to low concentration). The trapping component can be supported as shown in FIG. 5(b). For example, a noble metal is deposited as the main catalyst component on a ceramic carrier having defects which becomes pores with Ba which is the promoter component being provided as a substituting element, thereby to obtain the ceramic catalyst body 1. The portion of the ceramic catalyst body 1 whereon the trap layer 2 is formed is immersed in ethanol solution including 0.2 mol/L of barium sulfide and is then dried and sintered at a temperature of 500 to 800° C. In this case, it is desirable to surround the noble metal used as the main catalyst component in the portion where the trap layer 2 is formed as shown in FIG. 5(b).

Examples of applying the present invention to the NOx occluding reduction catalyst have been described in the embodiment above. The poisoning component can be trapped so as to prevent the ceramic catalyst body 1 from being poisoned also by providing the trap layer 2 having other catalyst, of the same component as that receives the catalyst poisoning, supported thereon as the trapping component which adsorbs the catalyst poisoning component. For example, when a three-way catalyst is used, similar effect can be achieved by means of the trap layer 2 where a promoter component such as Zn, Pb, Fe, etc. which is supported together with the noble metal catalyst and is liable to the influence of sulfur included in the exhaust gas.

Figure 6:
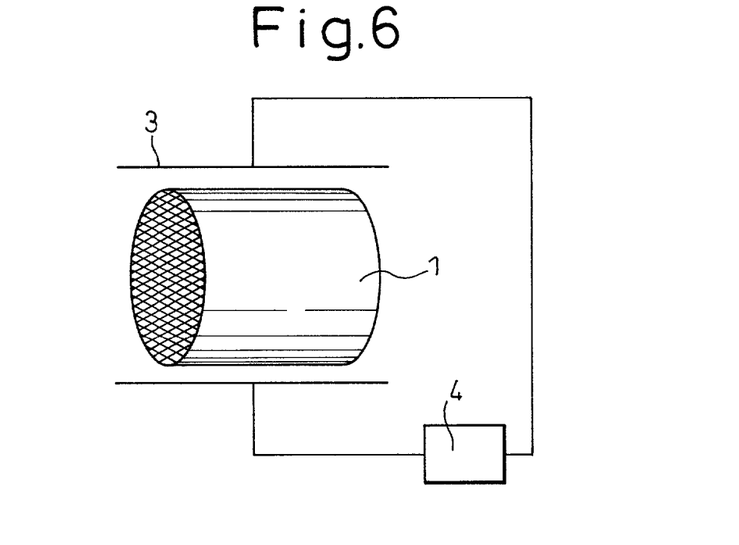
FIG. 6 shows the overall constitution of a ceramic catalyst body according to Example 3 of the invention.

Also as shown in FIG. 6, for Example 3, instead of providing the trap layer 2, a constitution may also be employed where means for heating the ceramic catalyst body 1 such as a heater 3 is provided as a catalyst regenerating device for the ceramic catalyst body 1 so that, when the catalyst performance has decreased due to catalyst poisoning, a power supply 4 energizes the heater 3 thereby to heat the ceramic catalyst body 1 and decompose the catalyst poisoning component. In the case of the NOx occluding reduction catalyst, for example, catalyst performance of Ba can be restored by keeping the temperature at 650° C. or higher for one minute or longer.

Moreover, in the NOx occluding reduction catalyst, with Rh supported as the main catalyst in an excessive quantity on the ceramic catalyst body 1, sulfide $BaSO_4$ may be decomposed by generating $H_2$ at the time of a rich atmosphere (reducing atmosphere).

According to the invention, as described above, the ceramic catalyst body 1 can be protected from catalyst poisoning and the poisoning resistance thereof can be greatly improved. Although FIG. 4(*a*) shows the ceramic catalyst body 1 and the trap layer 2 being disposed at a distance for the ease of understanding, the ceramic catalyst body 1 and the trap layer 2 may be disposed in contact with each other, as a matter of course.

The ceramic catalyst body 1 may also be regenerated, besides the methods described above, for example by bringing a solution or gas containing acid or alkali into contact with the ceramic catalyst body 1. Main catalyst poisoning components are sulfides generated by the reaction of SOx included in the exhaust gas with the metals which constitute the catalyst or the carrier, and oxides or sulfides of metals included in the lubricant. These materials can be decomposed or dissolved by using acid or alkali and the catalyst performance can be easily restored.

It is made easier to deprive oxides of oxygen or to decompose sulfides by exposing the ceramic catalyst body 1, which has been subjected to catalyst poisoning, to reduced pressure atmosphere, low-oxygen atmosphere or reducing atmosphere. Therefore, the catalyst can be regenerated also by changing the nature of the atmosphere. Since this reaction proceeds faster when the catalyst is heated, regeneration of the catalyst can be accelerated by combining the method of changing the atmosphere with heating.

While the regeneration process by means of the solution or gas can be carried out with the ceramic catalyst body 1 being mounted on an apparatus, the ceramic catalyst body 1 may also be taken out of the apparatus to apply the regeneration process for reducing the load on the apparatus, since an acid, an alkali, a reduced pressure, a low-oxygen atmosphere and a reducing atmosphere apply a significant load on the apparatus.

Besides the methods which uses heating, chemicals or other means, physical methods may also be employed to remove the catalyst poisoning component. Specifically, the catalyst poisoning component which has weak bonding force can be removed from the catalyst by applying vibration with a vibrator or an ultrasonic generator to the ceramic catalyst body 1 which has been poisoned, or blowing the ceramic catalyst body 1 with high pressure gas either in a pulsating or continuous flow. A catalyst poisoning component which dissolves in water and a catalyst poisoning component which has weak bonding force can be removed from the catalyst by immersing the ceramic catalyst body 1 in water or sending water into the pores of honeycomb either in a pulsating or continuous flow. Alcohol or other cleaning liquid may also be used, or washing and vibration may be combined. Moreover, the catalyst poisoning component may also be rubbed off the surface of the ceramic catalyst body 1 by means of a brush.

Regeneration by a chemical method which uses heating or chemicals may have adverse influence on the catalytic activity. To address this possibility, physical regeneration method may be employed. Removal by washing with water or vibration does not directly affect the catalytic activity point and is therefore preferably employed.

In the case of three-way catalyst of the prior art which is made by coating a ceramic carrier with γ-alumina and supporting a catalyst thereon, since γ-alumina can be corroded by nitric acid, aqua regia, hydrochloric acid and sulfuric acid, these acids can break the bond between the carrier and γ-alumina when brought into contact. Thus processing the three-way catalyst with an acid causes γ-alumina and the catalyst to come off the carrier. Also the coating layer of γ-alumina can come off when subjected to vibration or water jet, and this makes it difficult to regenerate. The ceramic catalyst body 1 which has the catalyst of the invention supported directly thereon can, in contrast, be regenerated by various methods.

The methods of regenerating the catalyst described above can be applied to both the ceramic catalyst body 1 which has the catalyst supported directly in the pores comprising defects or the like, and the ceramic catalyst body 1 which has the catalyst supported directly on the substituted element. Particularly in the case of the ceramic catalyst body 1 which has the catalyst supported directly on the substituted element, since the bonding force of the catalyst particles is greater than the bonding force of the catalyst particles which are supported in the pores, the regeneration process has a smaller influence and less deterioration is caused by repetitive regeneration processes, thus providing higher durability.

Figure 7:
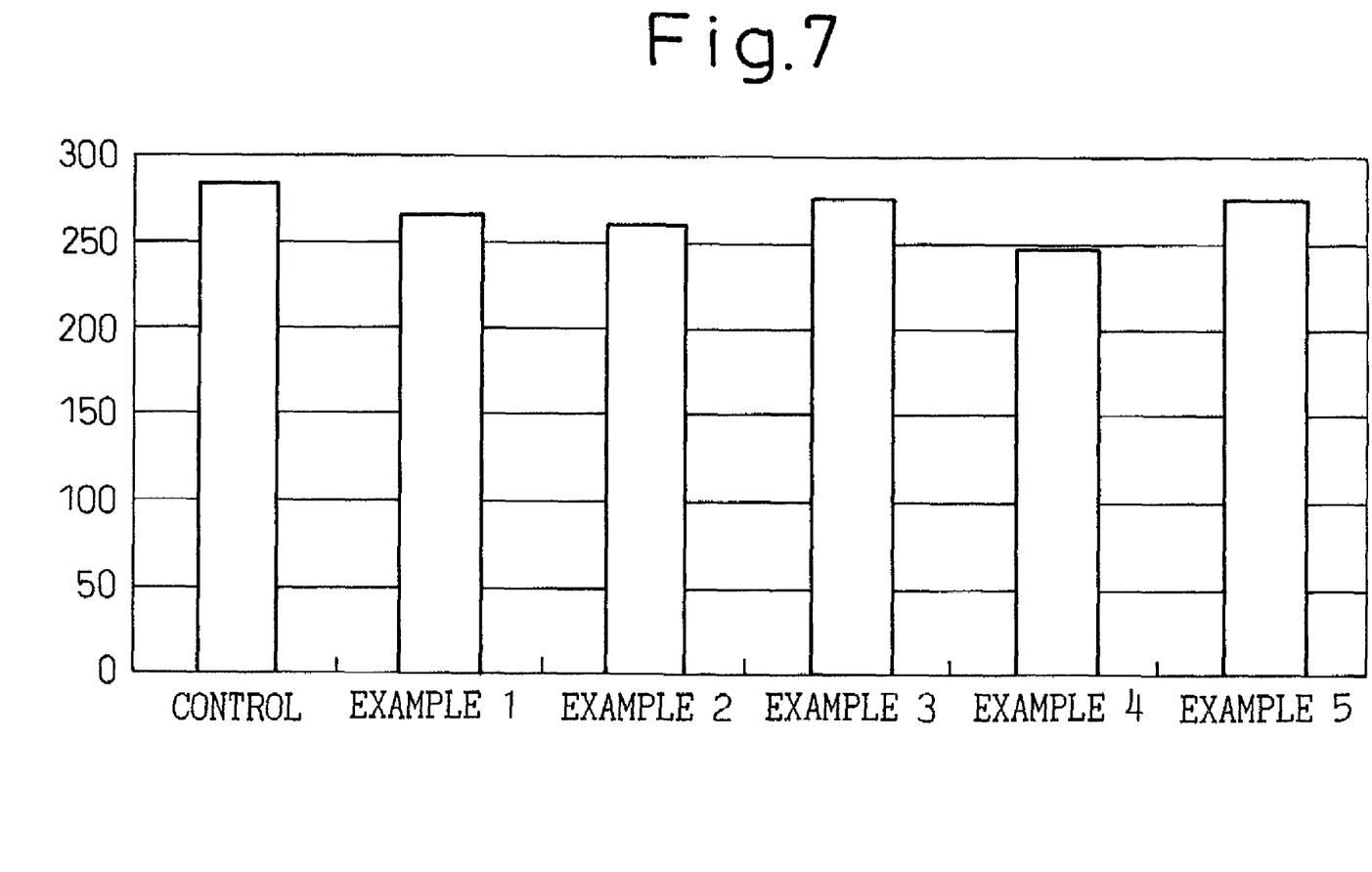
FIG. 7 shows the results of regeneration process according the Examples of the invention.

FIG. 7 shows the results of measurements of catalyst performance after applying various regeneration processes described above to the ceramic catalyst body 1 of the invention (Examples 1 to 5).

In Example 1, the ceramic catalyst was regenerated by pickling. The ceramic catalyst body 1 which had been exposed to the exhaust gas from an engine mounted on a vehicle was immersed in an aqueous solution of one normal nitric acid at the room temperature for 30 minutes. Then the ceramic catalyst body 1 taken out of the solution was rinsed with distilled water before drying at 100° C.

Example 2 is an example of regenerating with alkali. The ceramic catalyst body 1 which had been deteriorated similarly was exposed to a gas including 1,000 ppm of $NH_3$ at 500° C. for one hour. Then after stopping the supply of $NH_3$ and replacing the atmosphere in the apparatus with air, the ceramic catalyst was sintered at 500° C. Further, as an example of regeneration process in a sintering atmosphere, a sample of the ceramic catalyst body 1 which had been deteriorated similarly was sintered in $N_2$ gas stream at 700° C. for three hours (Example 3), and another sample was sintered in $H_2$ gas stream at 700° C. for three hours (Example 4). As an example of regeneration process by physical method, a sample of the ceramic catalyst body 1 which had been deteriorated similarly was subjected to an air flow at a pressure of 5 $kgf/cm^2$ directed into the apertures thereof for five minutes.

Combustion characteristic was measured using reaction gas of 500 ppm $C_3H_6$+5% $O_2$ gas on each of the samples of the ceramic catalyst body 1 which had been regenerated by the methods of Examples 1 to 5. FIG. 7 shows the temperature of 50% purification, which was lower than the temperature 285° C. of the catalyst body before subjected to the regeneration process (control) in every case, showing that the catalyst performance was restored.

What is claimed is:

1. A ceramic catalyst body comprising a ceramic carrier capable of supporting a catalyst component directly on the surface of a ceramic substrate having a crystal lattice and a catalyst supported on the ceramic carrier, wherein catalyst particles are provided with a layer containing an anti-evaporation metal formed at least in part of an outer surface thereof, wherein one or more of the elements that constitute the ceramic substrate is substituted with an element other than a constituent element, and the ceramic carrier is capable of supporting a catalyst metal directly on the substituting element.

2. The ceramic catalyst body according to claim 1, wherein the layer containing the anti-evaporation metal covers at least 10% of the outer surface of the catalyst metal particles.

3. The ceramic catalyst body according to claim 1, wherein the layer containing the anti-evaporation metal covers at least 50% of the outer surface of the catalyst metal particles.

4. The ceramic catalyst body according to claim 1, wherein the anti-evaporation metal is supported on the outer surface of the catalyst metal particles in the form of a metal, an oxide of the metal or an alloy.

5. The ceramic catalyst body according to claim 1, wherein the catalyst metal is a noble metal and the anti-evaporation metal is a high-melting point metal of which oxide has a melting point of 1,100° C. or higher.

6. The ceramic catalyst body according to claim 1, wherein the anti-evaporation metal has catalytic activity.

7. The ceramic catalyst body according to claim 1, wherein at least one metal selected from the group consisting of Ti, V, Cr, Mn, Fe, Co, Ni, Cu, Rh, Ta, W and Ir is used as the anti-evaporation metal.

8. The ceramic catalyst body according to claim 1, wherein the catalyst metal is supported on the substituting element by chemical bonding.

9. The ceramic catalyst body according to claim 1, wherein the substituting element is one or more element having a d or an f orbit in the electron orbits thereof.

10. A ceramic catalyst body comprising a ceramic carrier capable of supporting a catalyst component directly on the surface of a ceramic substrate having a crystal lattice and a catalyst supported on the ceramic carrier, wherein catalyst particles are provided with a layer containing an anti-evaporation metal formed at least in part of an outer surface thereof, wherein the ceramic carrier has a multitude of pores capable of directly supporting the catalyst on the surface of the ceramic substrate so that a catalyst metal can be supported directly in the pores, and wherein one or more of the elements that constitute the ceramic substrate is substituted with an element other than a constituent element, and the ceramic carrier is capable of supporting the catalyst metal directly on the substituting element.

11. The ceramic catalyst body according to claim 10, wherein the pores comprise at least one kind selected from the group consisting of defects in the ceramic crystal lattice, microscopic cracks in the ceramic surface and defects in the elements which constitute the ceramic.

12. The ceramic catalyst body according to claim 11, wherein the microscopic cracks measure 100 nm or less in width.

13. The ceramic catalyst body according to claim 11, wherein the pores have diameter or width 1,000 times the diameter of the catalyst ion to be supported therein, or smaller, and the density of pores is $1 \times 10^{11}$ /L or higher.

14. The ceramic catalyst body according to claim 11, wherein the ceramic substrate includes cordierite as the main component, and the pores comprise defects formed by substituting a part of the constituent elements of the cordierite with a metal element having different value of valence.

15. The ceramic catalyst body according to claim 14, wherein the defects comprise at least one of an oxygen defect or a lattice defect, and the density of cordierite crystal containing at least one defect in a unit crystal lattice of cordierite is set to $4 \times 10^{-6}$% or higher.

16. The ceramic catalyst body according to claim 10, wherein the layer containing the anti-evaporation metal covers at least 10% of the outer surface of the catalyst metal particles.

17. The ceramic catalyst body according to claim 10, wherein the layer containing the anti-evaporation metal covers at least 50% of the outer surface of the catalyst metal particles.

18. The ceramic catalyst body according to claim 10, wherein the anti-evaporation metal is supported on the outer surface of the catalyst metal particles in the form of a metal, an oxide of the metal or an alloy.

19. The ceramic catalyst body according to claim 10, wherein the catalyst metal is a noble metal and the anti-evaporation metal is a high-melting point metal of which oxide has a melting point of 1,100° C. or higher.

20. The ceramic catalyst body according to claim 10, wherein the anti-evaporation metal has catalytic activity.

21. The ceramic catalyst body according to claim 10, wherein at least one metal selected from the group consisting of Ti, V, Cr, Mn, Fe, Co, Ni, Cu, Rh, Ta, W and Ir is used as the anti-evaporation metal.

22. A ceramic catalyst body comprising a ceramic carrier capable of supporting a catalyst directly on the surface of a ceramic substrate having a crystal lattice and a catalyst component supported on the ceramic carrier, wherein a trapping component which adsorbs a catalyst poisoning component included in the gas to be purified is supported at least at the end face of the carrier in the upstream of the flow of gas to be purified, thereby providing a trap layer that traps the catalyst poisoning component, and wherein one or more of the elements that constitute the ceramic substrate is substituted with an element other than a constituent element, and the ceramic carrier is capable of supporting a catalyst metal directly on the substituting element.

23. A ceramic catalyst body comprising a ceramic carrier capable of supporting a catalyst directly on the surface of a ceramic substrate having a crystal lattice and a catalyst component supported on the ceramic carrier, wherein a trap layer is provided at a position near an end face of the ceramic carrier in an upstream flow direction of gas to be purified so as to trap a catalyst poisoning component included in the gas to be purified, wherein one or more of the elements which constitute the ceramic substrate of the ceramic carrier is substituted with an element other than the constituent element, so that the carrier is capable of supporting the catalyst component directly on the substituting element.

24. The ceramic catalyst body according to claim 23, wherein the catalyst component is supported on the substituting element by chemical bonding.

25. The ceramic catalyst body according to claim 23, wherein the substituting element is one or more element having d or f orbit in the electron orbits thereof.

26. The ceramic catalyst body according to claim 23, wherein the trap layer is formed by supporting a trapping component which adsorbs the catalyst poisoning component on a carrier coated with porous ceramic on the surface thereof.

27. The ceramic catalyst body according to claim 23, wherein the catalyst component includes a main catalyst component made of a noble metal and a promoter component which receives the catalyst poisoning, while the promoter component is used as the trapping component which adsorbs the catalyst poisoning component.

28. The ceramic catalyst body according to claim 23, wherein the ceramic carrier has a shape selected from the group consisting of honeycomb, pellet, powder foam body, fiber and hollow fiber.

29. A ceramic catalyst body comprising a ceramic carrier capable of supporting a catalyst directly on the surface of a ceramic substrate having a crystal lattice and a catalyst component supported on the ceramic carrier, wherein a trap layer is provided at a position near an end face of the ceramic carrier in an upstream flow direction of gas to be purified so as to trap a catalyst poisoning component included in the gas to be purified, wherein the ceramic carrier has a multitude of pores which are capable of supporting the catalyst directly on the surface of the ceramic substrate so that the catalyst component can be supported directly in the pores, and wherein one or more of the elements that constitute the ceramic substrate is substituted with an element other than a constituent element, and the ceramic carrier is capable of supporting a catalyst metal directly on the substituting element.

30. The ceramic catalyst body according to claim 29, wherein the pores comprise at least one kind selected from the group consisting of defects in the ceramic crystal lattice, microscopic cracks in the ceramic surface and defects in the elements which constitute the ceramic.

31. The ceramic catalyst body according to claim 30, wherein the microscopic cracks measure 100 nm or less in width.

32. The ceramic catalyst body according to claim 30, wherein the pores have diameter or width 1,000 times the diameter of the catalyst ion to be supported therein, or smaller, and the density of pores is $1 \times 10^{11}$/L or higher.

33. The ceramic catalyst body according to claim 30, wherein the ceramic substrate includes cordierite as the main component, and the pores comprise defects formed by substituting a part of the constituent elements of the cordierite with metal element having different value of valence.

34. The ceramic catalyst body according to claim 33, wherein the defects comprise at least one of an oxygen defect or a lattice defect, and the density of cordierite crystal containing at least one defect in a unit crystal lattice of cordierite is set to $4 \times 10^{-6}$% or higher.

35. The ceramic catalyst body according to claim 29, wherein the trap layer is formed by supporting a trapping component which adsorbs the catalyst poisoning component on a carrier coated with porous ceramic on the surface thereof.

36. The ceramic catalyst body according to claim 29, wherein the catalyst component includes a main catalyst component made of a noble metal and a promoter component which receives the catalyst poisoning, while the promoter component is used as the trapping component which adsorbs the catalyst poisoning component.

* * * * *